Jan. 6, 1931.  H. FOLKER  1,788,019

FEED FOR SLICING MACHINES

Filed Sept. 24, 1928

Inventor
Harold Folker
By his Attorney
W M Wilson

Patented Jan. 6, 1931

1,788,019

UNITED STATES PATENT OFFICE

HAROLD FOLKER, OF DAYTON, OHIO, ASSIGNOR TO THE DAYTON SCALE COMPANY, OF DAYTON, OHIO, A CORPORATION OF NEW JERSEY

FEED FOR SLICING MACHINES

Application filed September 24, 1928. Serial No. 307,850.

This invention relates to improvements in the details of meat slicing machines.

The particular object of the invention is to provide an improved intermittently feeding means for advancing the meat past the slicing knife.

More specifically, the object of the invention is to improve the construction of the supporting means for a lead screw such as shown in Patent No. 1,626,902, to G. R. Wood.

Further and other objects and advantages will be hereinafter set forth in the accompanying specification and claims, and shown in the drawings, which by way of illustration show what is now considered to be the preferred embodiment of the invention.

Figure 1:
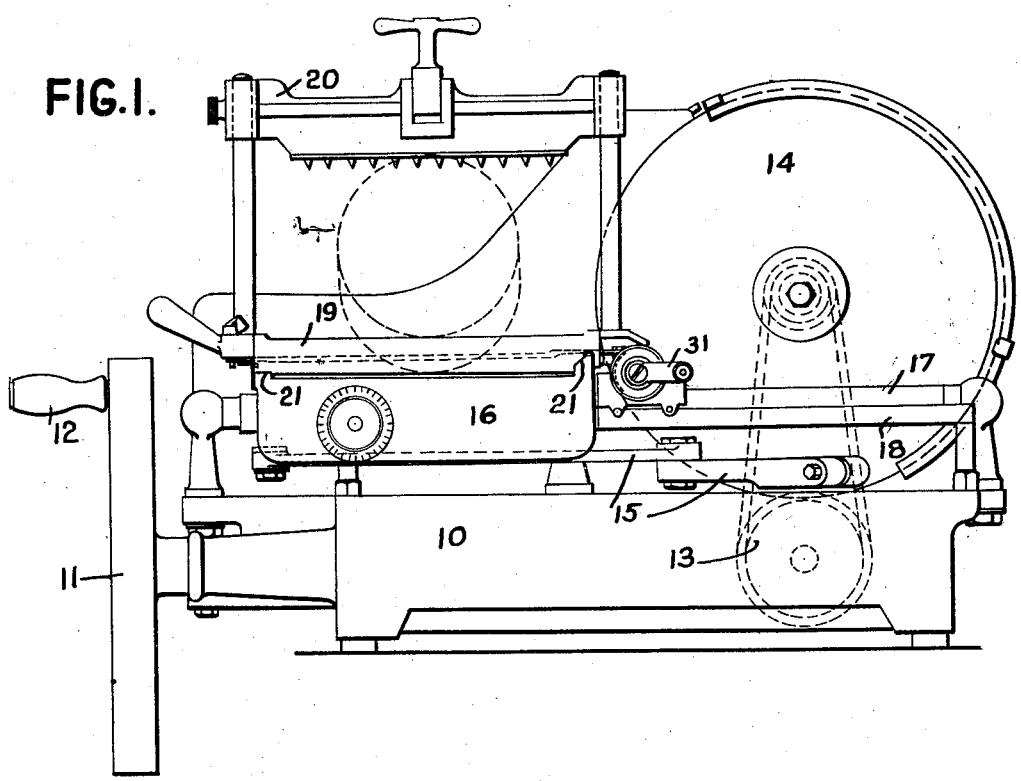
Fig. 1 is a side elevation of the machine.
Figure 2:
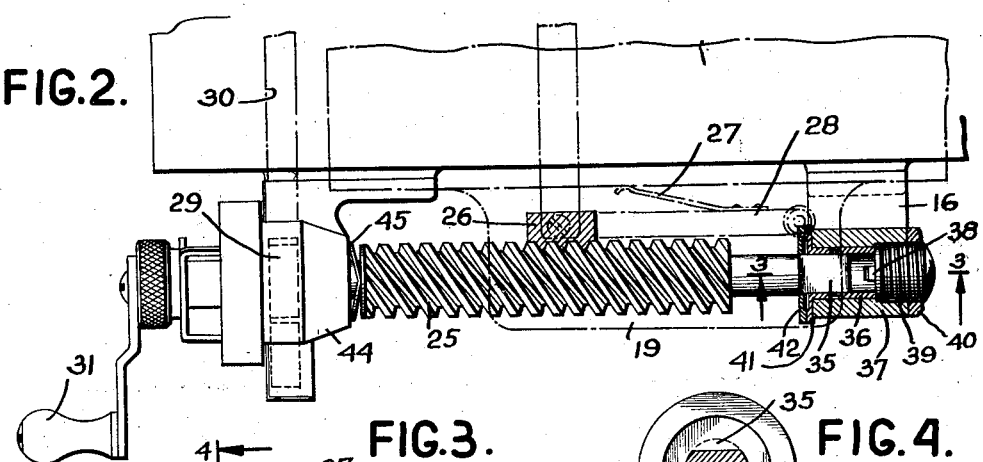
Fig. 2 is a detail view of the lead screw and the adjacent meat feeding elements.
Figures 3, 4:
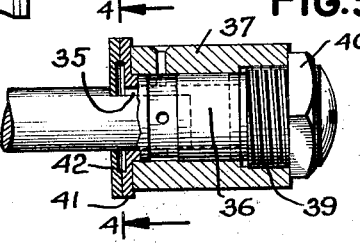
Fig. 3 is a section on line 3—3 of Fig. 2.
Fig. 4 is a section on line 4—4 of Fig. 3.

In general, the machine comprises a base 10, coacting within which are the usual driving shafts and gear devices for rotating the driving crank and the knife. The main shaft is operated by the fly-wheel 11 carrying the hand grip 12. Suitable gearing from the main shaft rotates a gear 13 which has a belt connection with the rotary slicing knife 14. Linkage 15 driven by the main shaft is connected to the main carriage 16 for reciprocating the carriage along guide rails 17 and 18. During the travel of the main carriage towards the knife, the meat clamped thereon is cut in a slice of predetermined thickness. The meat is clamped on a meat table 19 by means of an adjustable clamp 20. The meat table is guided for slidable movement on flanges or rails 21 integral with the main carriage. After a slice is cut from the meat clamped on the meat table, the latter is advanced a predetermined amount towards the plane of the knife, thereby presenting another thickness of meat to be cut off.

The meat table is advanced by means of a lead screw 25 with which is engaged a half-nut 26 yieldingly urged by spring 27 into engagement with the screw. The nut has an extension 28 which is connected to the meat table. The screw is rotated during the travel of the main carriage by means of a pinion 29 thereon meshing with rack 30 driven from the main shaft in a suitable manner. The screw may be manually rotated by a handle 31. For a more detailed and complete explanation of the mechanism above described, reference may be had to Patent No. 1,626,902, previously mentioned.

It has been found in the construction previously employed that there was a tendency for the worm 25 to creep during the cutting operation if the meat offered considerable resistance during the cutting operation, or if the machine was mounted on an unsteady support, or if the machine received a sudden blow during its operation.

The means hereinafter set forth are effective to prevent creeping of the worm shaft due to accidental circumstances, such as those mentioned above. The right hand end of the worm is provided with a flat face 35 formed by cutting off a sector from the body of the worm shaft. The cut away end of the shaft projects into a circular sleeve 36 rotatably mounted in the bearing bracket 37 fast to the main carriage 16. The outer end of the sleeve 36 has a slot engaging a lug 38 in a screw 39 threaded into the bracket 37 and locked by a nut 40. Sleeve 36 is formed with a flange 41 abutting the inner end of the bracket and in frictional engagement with a circular disk 42 abutting the flat wall formed on the end of the screw shaft at the point where the flat face 35 commences. The left hand end of the screw shaft is journalled in a bracket 44 and a spring washer 45 is inserted between the end of the threaded portion and the face of the bracket 44. The screw shaft rotates in brackets 37 and 44, the portion 35 of the worm shaft being freely rotatable relative to the sleeve 36 into which it projects. The rotation of the screw shaft is, however, opposed by friction washer 45 and friction plate 42.

The frictional resistance of the washer and plate may be adjusted by rotating the screw 39 which effects movement of the sleeve 36 and the plate 42 abutting the flange 41 of the sleeve thereby adjusting the frictional resistance of washer 45 and plate 42 to the rotation of the screw shaft. The positive rotation of the screw by means of rack 30 and pinion 29 is thereby permitted while the tendency of the worm to creep is prevented by the frictional means 45 and 42.

It is obvious that plate 42 may be formed rigidly with flange 41 of the sleeve 36.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only by the scope of the following claims.

I claim:

1. In a meat slicer, a worm for advancing the meat plate, bearing supports for each end of the worm, a friction member coacting with one end of the worm, a spring washer acting on a vertical face at the other end of the worm urging the worm into frictional contact with said member, said washer being held between the latter vertical face and the adjacent support, and means threaded into the other support and engaging said disk for adjusting the frictional force between the disk and the adjacent end of the worm.

2. In a meat slicer, a worm for advancing the meat plate, supports for each end of the worm, a friction member coacting with one end of the worm, and a screw threaded into the support for the latter end of the worm and having a portion engaging said member to adjust the friction thereof against the latter end of the worm.

3. In a meat slicer, a worm for advancing the meat plate, supports for both ends of the worm, a spring washer between one support and a flat vertical portion of the adjacent end of the worm urging the worm in one direction, a friction disk cooperating with a vertical face on the other end of the worm, segmental portions on both the disk and the adjacent end of the worm for non-rotatably connecting the two, a flanged collar having the face of the flanged portion engaged with the disk and the circular portion rotatably engaging the interior of the adjacent support, a sleeve within the latter support having one end engaging said circular portion, a screw threaded into the latter support and non-rotatably keyed to the sleeve whereby adjustment of the screw actuates said sleeve to adjust the friction between the disk and the face of the flanged portion of the collar.

In testimony whereof I hereto affix my signature.

HAROLD FOLKER.